United States Patent [19]

Yamanaka

[11] Patent Number: 4,462,218
[45] Date of Patent: Jul. 31, 1984

[54] AIR-CONDITIONING SYSTEM FOR MOTOR VEHICLE COMPARTMENT AND METHOD FOR CONTROLLING THE SAME

[75] Inventor: Takayuki Yamanaka, Kariya, Japan

[73] Assignee: Nippondenso Co., Ltd., Kariya, Japan

[21] Appl. No.: 478,549

[22] Filed: Mar. 24, 1983

[30] Foreign Application Priority Data

Mar. 25, 1982 [JP] Japan .................. 57-48409

[51] Int. Cl.³ ........................... F25B 7/00
[52] U.S. Cl. ........................ 62/175; 165/43
[58] Field of Search .......... 165/25, 43; 236/49; 62/175; 98/2.01

[56] References Cited

U.S. PATENT DOCUMENTS

| | | | |
|---|---|---|---|
| 4,272,015 | 6/1981 | Houser | 165/43 X |
| 4,364,513 | 12/1982 | Tsuzuki et al. | 236/49 |
| 4,426,852 | 1/1984 | Nishimura et al. | 165/43 X |

Primary Examiner—William E. Wayner
Assistant Examiner—J. Sollecito
Attorney, Agent, or Firm—Cushman, Darby & Cushman

[57] ABSTRACT

In an air-conditioning system for a motor vehicle compartment, having first and second air-conditioning units which are arranged to cover mainly first and second zones in the compartment respectively, a seat switch is provided to detect the presence of an occupant in the second zone, and the direction of airflow from the first air-conditioning unit is periodically changed so that the airflow periodically extends to the second zone when the second air-conditioning unit is in off-state in the presence of an occupant in the second zone. The flow rate of the air from the first air-conditioning unit may be increased so that airflow therefrom effectively flows into the second zone. The flow rate of the air from the first and second air-conditioning units may be controlled in accordance with the difference between actual temperature and a setting temperature. When the second air-conditioning unit is in on-state, the presence of an occupant in the second zone may be detected to disable the second air-conditioning unit in the absence of an occupant.

19 Claims, 5 Drawing Figures

AIR-CONDITIONING SYSTEM FOR MOTOR VEHICLE COMPARTMENT AND METHOD FOR CONTROLLING THE SAME

BACKGROUND OF THE INVENTION

The present application is related to co-pending applications Ser. Nos. 260,601 and 395,340.

This invention relates generally to air-conditioning control system for a motor vehicle, and particularly the present invention relates to such a system having two air conditioning units.

In some air-conditioning control system for a motor vehicle compartment, two air-conditioning control units are employed so that the entire compartment is covered by the two units effectively. Usually, these two units are respectively located at the front and the rear of the vehicle so that the front unit mainly covers the front portion or zone within the compartment, while the rear unit mainly covers the rear zone. These two air-conditioning control units are arranged to be turned on or off manually or automatically. In a known automatically controlled air-conditioning system having two units, the rear unit is turned on automatically depending on the working condition of the front unit. However, none of conventional air-conditioning control systems of this type is arranged to precisely control the air-conditiong depending on the presence of an occupant or occupants in a predetermined zone or position. In other words, when no occupant exist on the rear seat of a motor vehicle, it is desired that the rear unit is turned off, and on the other hand, when one or more occupant has seated on the rear seat, it is desirable that air-conditioning is effected by means of the front or rear unit.

SUMMARY OF THE INVENTION

It is, therefore, an object of the present invention to provide a new and useful air-conditioning system for a motor vehicle, with which presice control of air-conditioning can be effected.

Another object of the present invention is to provide an air-conditioning system for a motor vehicle, with which power consumption is effectively controlled in such a manner that air-conditiong is effected only when it is needed.

A further object of the present invention is to provide an air-conditioning system for a motor vehicle, with which the degree of air-conditioning can be automatically controlled in accordance with ambient conditions, and also manually controlled so as to provide air-conditioning desired by each occupant.

According to a feature of the present invention first and second air-conditioning units are employed such that the entire vehicle compartment is covered by them in such a manner that a first zone within the compartment is mainly covered by the first unit, while a second zone is mainly covered by the second unit, and the first unit is capable of changing its covering zone or range so that not only the first zone but also the second zone can be covered by the first unit when needed. To this end the airflow from the first unit may be changed or the direction of the airflow from the same may be changed. In order that the air-conditioning system according to the present invention functions as the above, the system comprises means for detecting the presence of one or more occupants at the second zone. An output signal from this detecting means is used to either automatically turn on or off the second unit or to cause the first unit to increase and decrease its covering range so that most comfortable air-condtioning is effected for all the occupants.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
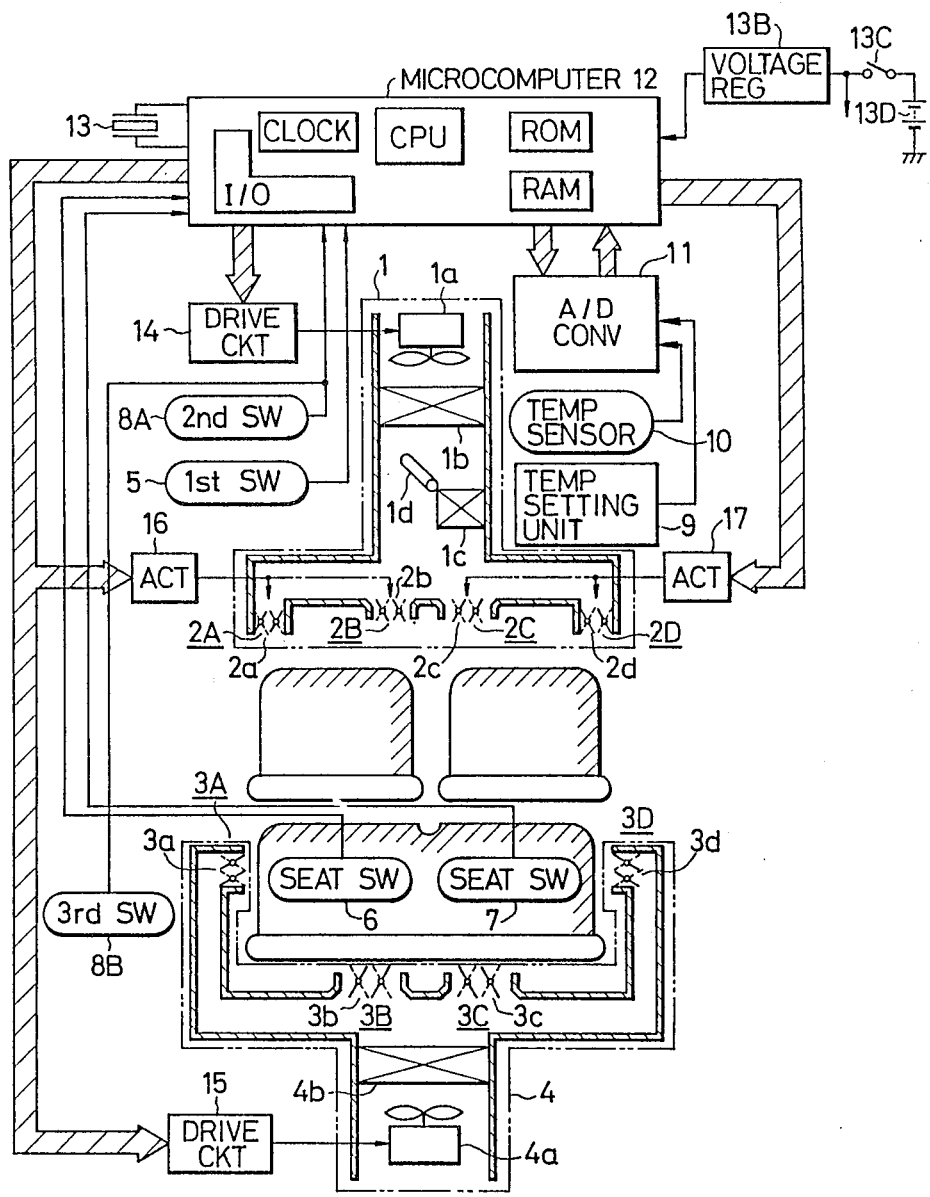
FIG. 1 is a schematic diagram of an embodiment of the air-conditioning system according to the present invention.

Referring now to FIG. 1 showing a schematic diagram of an embodiment of the present invention, the air-conditioning system comprises generally a first air-conditioning unit 1, a second air-conditioning unit 4, a first set of four air outlets 2A, 2B, 2C and 2D, a second set of four air outlets 3A, 3B, 3C and 3D. It is assumed that the air-conditioning system is adapted to a passenger vehicle having a first or front zone and a second or rear zone within a vehicle compartment in which a pair of front seats FS and rear seats RS are positioned.

The first air-conditioning unit 1 per se is a conventional one, and comprises a conventional blower motor $1a$ which selectively introduces external air or internal air into a vehicle compartment, an evaporator $1b$, through which airflow from the blower motor $1a$ is transmitted to be cooled, a heater core $1c$, which heats the airflow from the blower motor $1a$ by using the heat of engine coolant, and an air mixing damper $1d$, which adjusts the ratio between airflow toward the evaporator $1b$ and another airflow toward the heater core $1c$. The first set of air outlets 2A to 2D communicate with the first air-conditioning unit 1 so as to deliver temperature-controlled air therethrough. Two outlets 2B and 2C are located at the front-center of the vehicle compartment, while remaining two outlets 2A and 2D are located at the front-right-left of the same. Each of the outlets 2A to 2D comprises air directioning plates $2a$ to $2d$, which are rotatable so as to change the direction of airflow from each outlet.

The second air-conditioning unit 4 per se is also conventional one, and comprises a blower motor $4a$ and an evaporator $4b$. The second set of air outlets 3A to 3D communicate with the second air-conditioning unit 4 so as to deliver temperature-controlled air therethrough. Two outlets 3B and 3C are located at the rear-center of the vehicle compartment, while remaining two outlets 3A and 3D are located at the rear-right-left of the same. Each of the outlets 3A to 3D comprises air directioning plates $3a$ to $3d$, which are rotatable so as to change the direction of airflow from each outlet.

The air directioning plates $2a$ to $2d$ of the first air outlet set are arranged to be rotated by means of actuators as will be described later, while the air directioning plates 3a to 3d of the second air outlet set are arranged to be rotated manually.

The air-conditioning system further comprises three manually operable switches 5, 8A and 8B. The switch 5, which will be referred to as a first switch hereafter, is mounted in the vicinity of the vehicle driver's seat, namely on the instrument panel or the like, and is used to produce an automatic extension mode command signal when depressed. The remaining switches 8A and 8B, which will be referred to as second and third switches hereafter, are respectively mounted around the front zone including the front seats FRS and FLS, and the rear zone including the rear seats RS. These second and third switches 8A and 8B are connected in parallel to produce an identical command signal which causes the second air-conditioning unit 4 to be turned on or off.

The system of FIG. 1 further comprises seat switches 6 and 7 which are arranged to be closed when an occupant seats on a corresponding seat of the rear seats RS. The seat switches 6 and 7 produce an output detection signal indicative of the presence of an occupant on a corresponding seat.

The system also comprises a temperature setting unit 9 with which a desired temperature may be set. Namely the temperature setting unit 9 is mounted on the instrument panel or the like, and is manually operable so that an output signal indicative of the desired temperature is produced. A temperature sensor 10 is provided to measure an actual temperature within the vehicle compartment and to produce an output signal indicative of the same. The temperature sensor 10 may be located within the compartment so that an average temperature therein is detected. For instance, the sensor 10 may be mounted on the instrument panel. An analog-to-digital (A/D) converter 11 is provided to receive analog output signals from the above-mentioned temperature setting unit 9 and the temperature sensor 10, and to convert the analog data into digital data.

The air-conditioning control system also comprises a control unit comprised of a microcomputer 12 which executes various operations as will be described later in accordance with a predetermined program. The microcomputer 12 is powered by a battery 13D mounted on the vehicle. In detail, D.C. power from the battery 13D is supplied via an ignition switch 13C and a voltage regulator 13B to the microcomputer 12. The microcomputer 12 is connected to a crystal resonator 13A of several megaherz, and comprises, as in the same manner as well known other microcomputers, a central processing unit (CPU), a read-only memory (ROM), a random-access memory (RAM), a clock generator, and an input-output device (I/O). A predetermined control program is prestored in the ROM, and is read out therefrom so that the CPU operates according to the control program. The RAM is used to temporarily store various data which are necessary for computing and deriving output data. The clock generator is used to generate reference clock pulses necessary for computing.

The microcomputer 12 receives information from the A/D converter 11 and the seat switches 6 and 7 to produce various output control signals with which the first and second air-conditioning units 1 and 4 are controlled. In detail, first and second drive circuits 14 and 15 associated with the blowers 1a and 4a of the first and second air-conditioning units 1 and 4 are arranged to receive output signals from the microcomputer 12 so that the rotational speed of the blower motors 1a and 4a are respectively controlled for controlling the flow rate. Furthermore, actuators 16 and 17 associated with the air directioning plates 2a to 2d are respectively controlled by an output signal from the microcomputer 12 so that the directions of airflows from the first set of air outlets 2A to 2D are controlled. The actuators 16 and 17 comprise an electrical servo motor which causes the air directioning plates 2a to 2d to rotate.

In detail, the air directioning plates 2a and 2b are gang-controled by the actuator 16, while the air directioning plates 2c and 2d are also gang-controled by the actuator 17. When each of the air-directioning plates 2a to 2d is positioned at dotted lines, airflow from the front-left outlet 2A and another airflow from the front center outlet 2B are both directed to an occupant seated on the front left seat FLS. Assuming that the actuator 16 operates to cause the air-directioning plates 2a and 2b to assume another position shown by solid lines, the airflow from the front-left outlet 2A is directed to the left window (not shown), while the airflow from the front center outlet 2B is directed to the center portion between the front-left seat FLS and the front-right seat FRS, where no occupant is seated. The other actuator 17 operates in the same manner as the actuator 16 so that airflow directed to an occupant seated on the front-right seat FRS is changed.

Although the air-conditioning system comprises various devices or elements, such as an electromagnetic clutch for coupling a compressor, which causes the evaporator 1b to cool air, to the vehicle engine, an actuator for driving the air mixing damper 1d, and an electromagnetic clutch for coupling the evaporator 4b to a coolant conduit, all these elements are known, and therefore, they are not shown. Furthermore, electrical circuits for causing these elements to operate in accordance with instructions from the microcomputer 12 are also not shown.

Now the operation of the system of FIG. 1 will be described with reference to a flowchart showing the operational flow of the microcomputer 12. When the ignition key switch 13C of a motor vehicle, on which the system of FIG. 1 is mounted, is turned on, the microcomuter 12 is rendered operable in receipt of electrical power from the battery 13D via the voltage regurator 13B, and a predetermined control program will be reapeatedly executed at a period of several hundreds of milliseconds.

Figure 4:
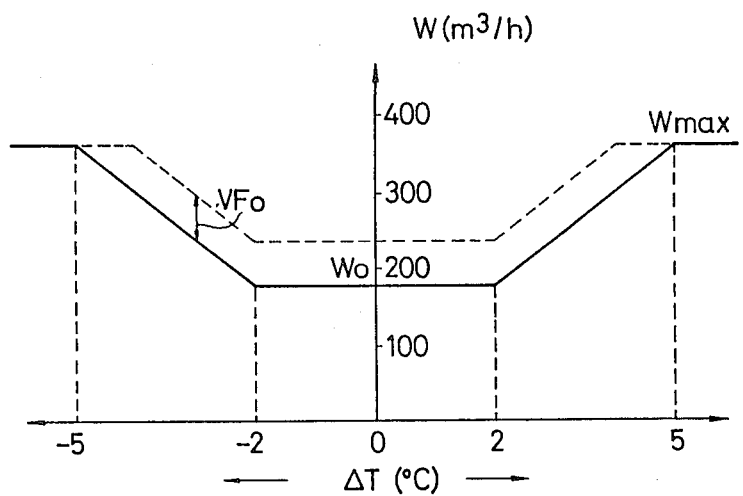
FIGS. 4 and 5 are diagrams useful for understanding the way of control effected by the microcomputer of FIG. 1.

In a first step 101, various external data are stored in the RAM. In a following step 102, it is detected whether the first switch 5 is closed or not to see whether the automatic extension mode has been selected or not. The automatic extension mode is selected when it is desired to extend the air-conditioning effect by the first air-conditioning unit 1 to the rear zone so that both the front and rear zones are covered by the first air-conditioning unit 1 when the second air-conditioning unit 4 is in off state. The operation of the system of FIG. 1 mainly divided into two modes depending on the result of this detection. If the first switch 5 has been closed indicating the automatic extension mode, a step 103 is executed in which a voltage $V_F$ to be applied to the blower motor 1a of the first air-conditioning unit 1 is computed as a function of the difference between the actual temperature $T_R$ in the compartment and a setting temperature $T_S$. In detail, the voltage $V_F$ for determining the flow rate W through the first air conditioning unit 1 is computed by using a fuunction or relationship such as shown in FIG. 4. The reference $\Delta T$ in FIG. 4 indicates the difference between the measured temperatue $T_R$ and the setting temperature $T_S$. As will be understood from FIG. 4, when $|T_R-T_S|>5$, a maximum flow rate W is resulted.

In a following step 104, it is detected whether one or both of the second and third switches 8A and 8B is closed to ascertain whether an instruction for operating the second air-conditioning unit 4 has been applied. If the answer of the step 104 is YES, a command signal for operating the unshown electromagnetic valve is produced so that the evaporator 4b is cooled. After this, a step 106 is executed to compute a voltage $V_R$ to be applied to the blower motor 4a of the second air-conditioning unit 4, and this voltage data is then fed to the drive circuit 15. This voltage $V_R$ is computed as a function of the voltage $V_F$ obtained in the step 103, which voltage $V_F$ is applied to the other blower motor 1a. If the characteristics of the blower motor 4a are the same as those of the other blower motor 1a, the voltage $V_R$ may be simply calculated by multiplying the voltage $V_R$ by a constant.

Figure 5:
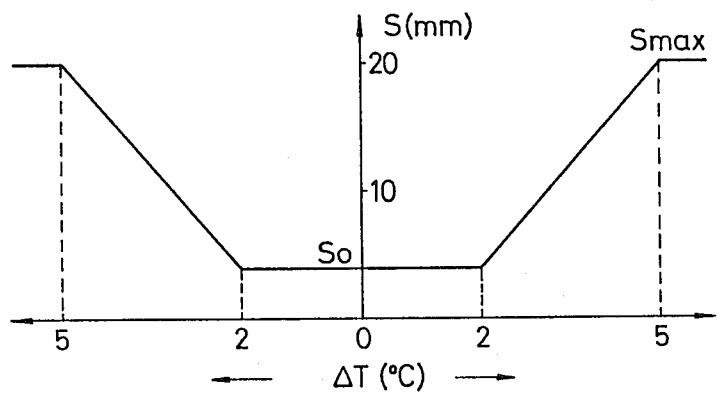

Then in a following step 109, an operating amount S of the actuators 16 and 17 is computed as a function of the temperature difference $\Delta T$. Namely, the operating amount S will be derived by using a predetermined function or relationship as shown in FIG. 5. After execution of the step 109, a step 114 is executed in which the opening degree of the air-mixing damper 1d is computed so that the temperature of the air delivered from the first air-conditioning unit 1 is controlled. Furthermore, the above-mentioned unshown electromagnetic clutch will be controlled when necessary so as to control the temperature of air from the first air-conditioning unit 1. Since this step 114 is known from U.S. Pat. Nos. 4,358,936 and 4,316,251, a detailed description thereof is omitted.

The above-described operation of the microcomputer 12 is directed to an automatic extension mode with the second air-conditioning unit being operated. When air-conditioning is effected in this way, the actuators 16 and 17 cause the air directioning plates 2a to 2d to direct more air from their corresponding outlets 2A to 2D to occupants seated on the front seats FLS and FRS as the difference $\Delta T$ between the actual temperature $T_R$ and the setting temperature $T_S$ is large. On the other hand, as the actuatl temperature $T_R$ approaches the setting temperature $T_S$, the direction of the air from the outlets 2A to 2D is changed so that airflow is undirected to occupants on the front seats FLS and FRS, while the flow rate of the air decreases. Since the air directioning plates 3a to 3d at the outlets 3A to 3D of the second air-conditioning unit 4 are manually operable, and are not automatically rotated, the direction of airflows from the outlets 3A to 3D may be manually adjusted.

Figure 2:
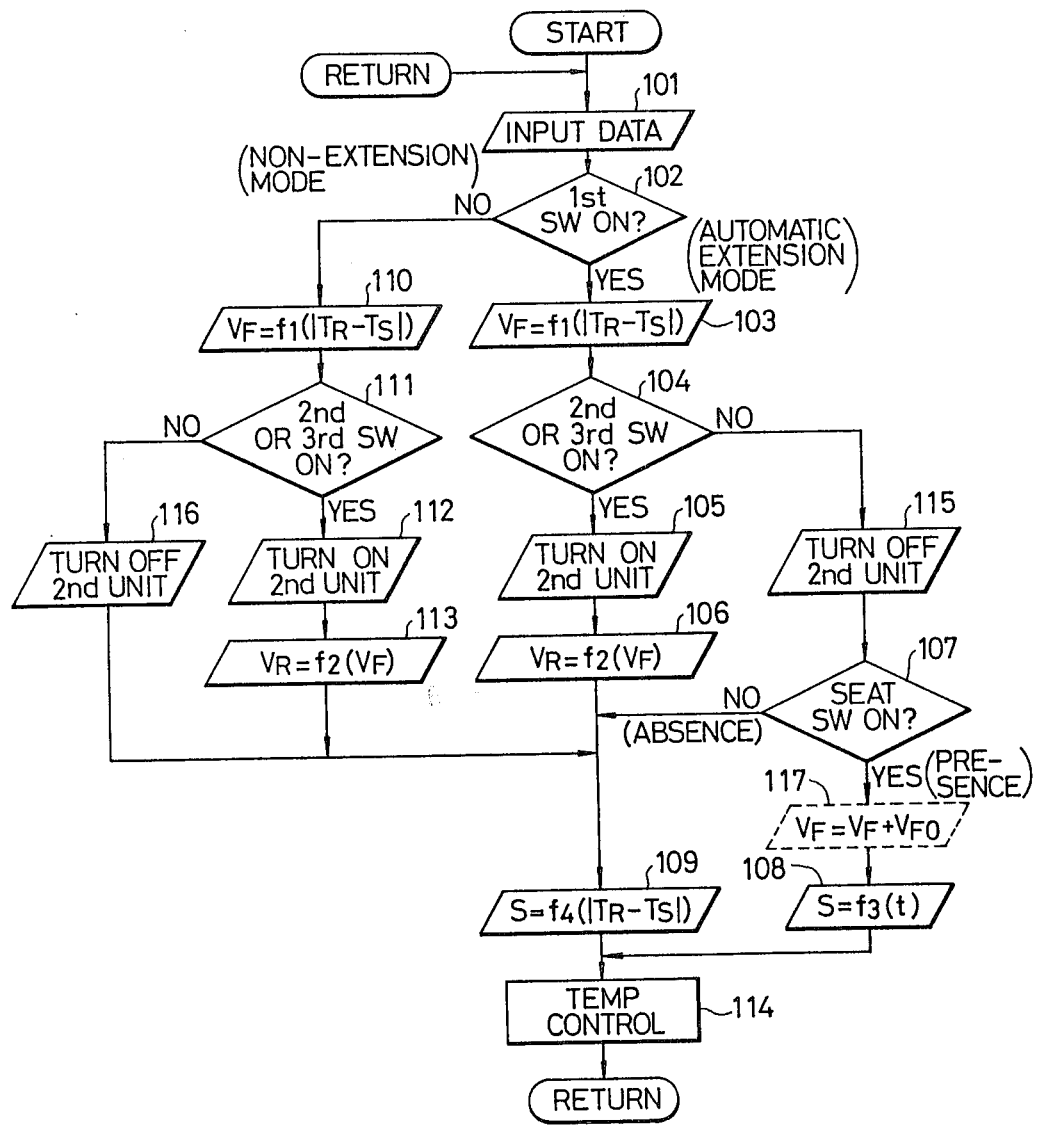
FIGS. 2 and 3 are flowcharts showing the operation of the microcomputer used in the system of FIG. 1.

Turning back to the flowchart of FIG. 2, if the second and third switches 8A and 8B are both open, the answer of the step 104 becomes NO, and therefore a step 115 is executed in which a command signal is produced for closing the electromagnetic valve and for stopping the blower motor 4a of the second air-conditioning unit 4. Then in a step 107, it is detected whether the seat switches 6 and 7 have been closed. If one or both of the seat switches 6 and 7 is closed indicating the presence of one or more occupants on the rear seat(s) RS, a step 108 is executed to compute the operating amount S of the actuators 16 and 17 as a function of time t. The time t is a value obtained by processing an internal timer within the microcomputer 12, and therefore, the operating amount S varies periodically between a minimum value So and a maximum value Smax. In response to such varying operating amount, the air direcioning plates 2a to 2d of the first air-conditioning unit 1 perodically swing or oscillate so that the direction of airflows from the outlets 2A to 2D changes at a period of several seconds. As a result, although the second air-conditioning unit 4 is not operating, the air from the outlets 2A to 2D of the first air-conditioning unit 1 is mixed in the compartment so that airflows reach the rear zone periodically. Preferably, a step 117 may be added so that the voltage $V_F$ applied to the blower motor 1a of the first air-conditioning unit 1 is increased by an amount $V_{F0}$. With such an increase in voltage, the airflow from the outlets 2A to 2D may effectively reach the rear zone. However, this step 117 may be omitted if unnecssary, and therefore the step 117 is shown by way of dotted lines. After the step 108, the aforementioned step 114 is then executed.

If the answer of the step 107 is NO, the operational flow proceeds to the step 109. Namely, the above-mentioned periodic change or oscillation in airflow direction is not effected because no occupant exists in the rear zone. From the above, it will be understood that airflows from the first air-condioning unit 1 are periodically directed to the rear zone if at least one occupant is seated on the rear seat RS when the second air-conditioning unit 4 is not operating. As a result, air-conditioning effect extends to the rear zone automatically.

Turning back to the step 102, if the first switch 5 is open, the system of FIG. 1 is put in non-extension mode in which oscillation in airflow direction is not performed irrespective of the presence of an occupant in the rear zone. In the non-extension mode, steps 110 to 113 and 116, which are identical with the steps 103 to 106 and 115, are executed. Namely, the voltage $V_F$ to the blower motor 1a of the first air-conditioning unit 1 and the voltatge $V_R$ to the blower motor 4b of the second air-conditioning unit 4 are respectively computed as functions of the temperature difference $\Delta T$. However, the steps 110 and 113 for computing these voltages $V_R$ and $V_F$ may be omitted if the flow rate of air from each of the first and second air-conditioning units 1 and 4 is desired to be manually controlled. In this case, flow rate setting unit or units may be provided so that the voltages $V_R$ and $V_F$ are respectively manually adjusted. In the flowchart of FIG. 2, after the execution of the step 113 or 106, the operational flow goes to the step 109.

From the above it will be understood that the first air-conditioning unit 1 covers both the front and rear zones when needed if the automatic extension mode has been selected, and if the automatic extension mode has not been selected the first and/or second air-conditioning unit are/is operated so that the front and rear zones are respectively covered mainly by the first and second air-conditioning units.

In the flowchart of FIG. 2, if the second or third switch 8A or 8B is closed, the determination in the step 104 results in YES so that the step 105 is executed to turn on the second air-conditioning unit 4. However, if no occupant exists in the rear zone, operation of the second air-conditioning unit 4 results in undesirable power consumption. Therefore it is desirable to detect the presence of an occupant in the rear zone when the determination in the step 104 results in YES.

Figure 3:
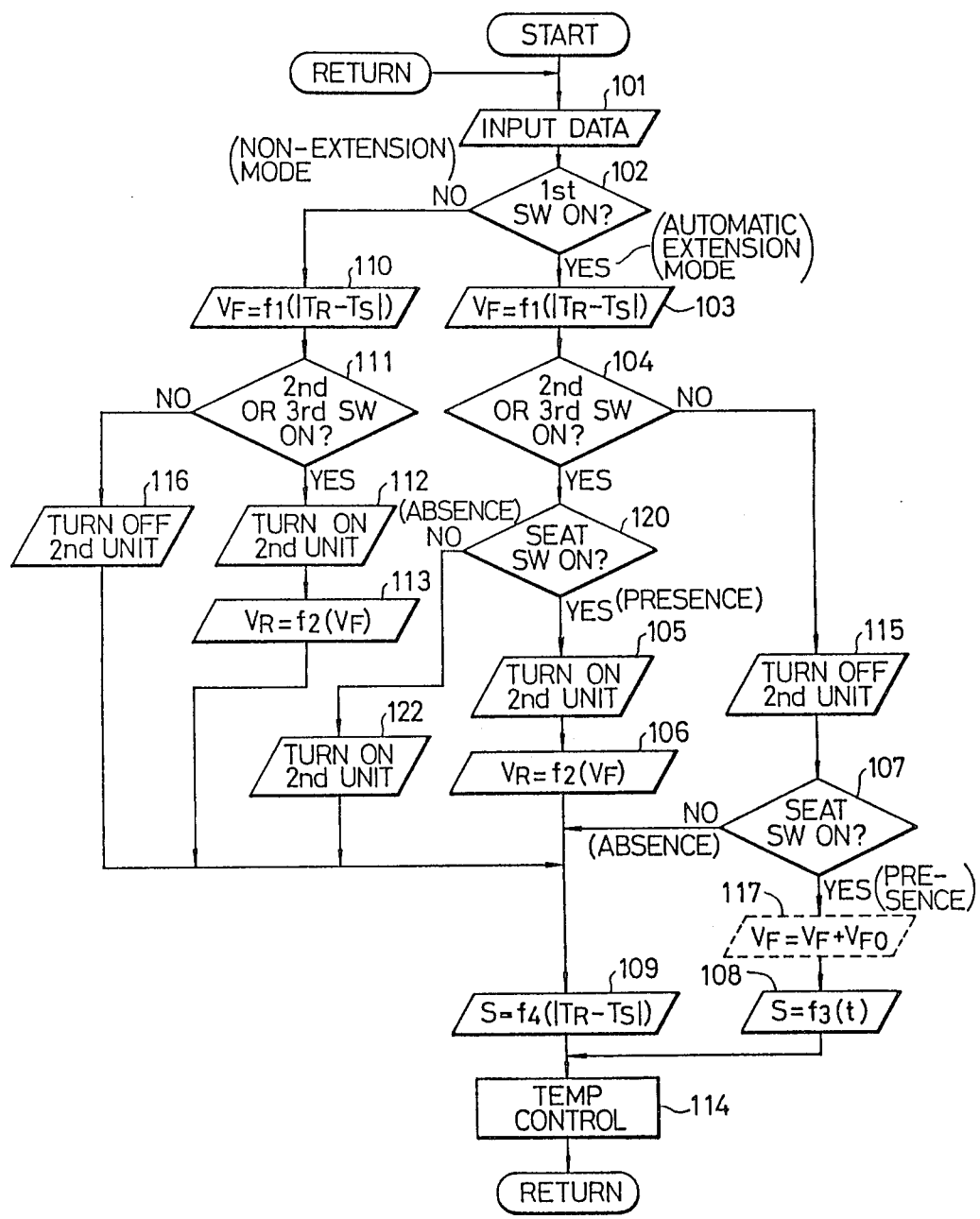

Hence, reference is now made to FIG. 3 which shows a modification of the flowchart of FIG. 2. The flowchart of FIG. 3 includes steps which are the same as those in FIG. 2, and also includes additional steps 120 and 122. The step 120 is interposed between the steps 104 and 105, and is the same as the step 107 in which the presence of one or more occupant in the rear zone is detected. If the answer of the step 120 is YES, the step 105 is exeucted to turn on the second air-conditioning unit 4. On the other hand, if no occupant is detected, the step 122 is exeucted to turn off the second air-conditioning unit 4.

The above-described embodiments are just examples of the present invention, and therefore, it will be apparent for those skilled in the art that many modifications and variations may be made without departing from the following claims defining the present invention.

What is claimed is:

1. An air-conditioning system for a motor vehicle compartment having first and second zones, comprising:
   (a) a first air-conditioning unit arranged to deliver temperature-controlled airflow into said compartment, said first air-conditioning unit having at least one air outlet facing said first zone;
   (b) means for changing the direction of said airflow in accordance with an electrical signal;
   (c) a second air-conditioning unit arranged to deliver temperature-controlled airflow into said compartment in response to a detection signal from a manually operable switch, said second air-conditioning unit having at least one air outlet facing said second zone;
   (d) means for detecting the presence of one or more occupant in the second zone; and
   (e) a control unit for producing said control signal with which the direction changing means is controlled so that said airflow from said air outlet of said first air-conditioning unit are directed not only to said first zone but also to said second zone when said second air-conditioning unit is in off-state and when one or more occupant in said second zone has been detected.

2. A system as claimed in claim 1, wherein said first air-condintiong unit is located at the front of said compartment, and said second air-conditioning unit is located at the rear of said compartment.

3. A system as claimed in claim 1, wherein said direction changing means comprises a plurality of air directioning plates movably installed in said air outlet of said first air-conditioning unit, and at least one actuator for changing the attitude of said air directioning plates in accordance with said control signal from said control unit.

4. A system as claimed in claim 1, wherein said control unit is so arranged to produce said control signal with which the direction of airflow from said air outlet of said first air-conditioning unit is periodically changed when said second air-contioning unit is in off state and when one or more occupant in said second zone has been detected.

5. A system as claimed in claim 3, wherein said control unit is so arranged to produce said control signal with which said air directioning plates are moved in an oscillatory motion when said second air-contioning unit is in off state and when one or more occupant in said second zone has been detected.

6. A system as claimed in claim 1, wherein said control unit is so arranged to cause said first air-conditioning unit to increase flow rate of air therethrough when said second air-conditioning unit is in off-state and when one or more occupant in said second zone has been detected.

7. A system as claimed in claim 1, wherein said control unit is so arranged to produce said control signal with which the direction of airflow from said air outlet of said first air-conditioning unit is periodically changed when said second air-contioning unit is in off state and when one or more occupant in said second zone has been detected, said control unit being also so arranged to cause said first air-conditioning unit to increase flow rate of air therethrough when said second air-conditioning unit is in off-state and when one or more occupant in said second zone has been detected.

8. A system as claimed in claim 1, wherein said control unit is so arranged to disable said second air-conditioning unit when no occupant in said second zone has been detected under an on-state of said manually operable switch.

9. A system as claimed in claim 1, wherein said control unit is so arranged to control the flow rate of airflow through said first and second air-conditioning units in accordance with temperature information indicative of the diference between an actual temperature in said compartment and a setting temperature.

10. A system as claimed in claim 1, wherein said control unit is arranged to control said direction changing means so that the direction of airflow from said first air-conditioning unit is changed in accordance with temperature information indicative of the difference between actual temperature in said compartment and a setting temperature.

11. A system as claimed in claim 1, further comprising another manually operable switch arranged to produce a signal which causes said control unit to produce said control signal with which said direction changing means is controlled so that said airflow from said air outlet of said first air-conditioning unit is directed to mainly said first zone irrespective of the presence of an occupant in said second zone.

12. A method of controlling an air-conditioning system having first and second air-conditioning units arranged to cover mainly first and second zones respectively in a vehicle compartment, comprising the steps of:
   (a) turning on or off said second air-conditioning unit in accordance with an instruction signal from a vehicle occupant;
   (b) detecting the presence of an occupant in said second zone when said second air-conditioning unit is in off state; and
   (c) changing the direction of airflow from air outlet of said first air-conditioning unit in the presence of an occupant in said second zone when said second air-conditioning unit is in off-state.

13. A method as claimed in claim 12, further comprising the step of increasing the flow rate of air from said air outlet of said first air-conditioning unit when an occupant in said second zone has been detected during the off-state of said first air-conditioning unit.

14. A method as claimed in claim 12, further comprising the steps of;
   (a) detecting the presence of an occupant in said second zone when said second air-conditioning unit is in on-state; and
   (b) disabling said second air-conditioning unit in the presence of an occupant in said second zone.

15. A method as claimed in claim 12, further comprising the steps of;
(a) measuring an actual temperature in said compartment;
(b) receiving an electrical signal indicative of a setting temperature; and
(c) controlling the flow rate of air through said first air-conditioning unit in accordance with the difference between said actual temperature and said setting temperature.

16. A method as claimed in claim 12, further comprising the steps of;
(a) measuring an actual temperature in said compartment;
(b) receiving an electrical signal indicative of a setting temperature; and
(c) controlling the flow rate of air through said second air-conditioning unit, during the on-state of the same, in accordance with the difference between said actual temperature and said setting temperature.

17. A method as claimed in claim 12, further comprising the steps of:
(a) measuring an actual temperature in said compartment;
(b) receiving an electrical signal indicative of a setting temperature; and
(c) controlling the direction of airflow from air outlet of said first air-conditioning unit in accordance with the difference between said actual temperature and said setting temperature.

18. A method as claimed in claim 12, further comprising the steps of;
(a) measuring an actual temperature in said compartment;
(b) receiving an electrical signal indicative of a setting temperature;
(c) controlling the flow rate of air through said second air-conditioning unit, during the on-state of the same, in accordance with the difference between said actual temperature and said setting temperature; and
(d) controlling the direction of airflow from air outlet of said first air-conditioning unit in accordance with the difference between said actual temperature and said setting temperature.

19. A method of controlling an air-conditioning system having first and second air-conditioning units arranged to cover mainly first and second zones respectively in a vehicle compartment, comprising the steps of:
(a) turning on or off said second air-conditioning unit in accordance with an instruction signal from a vehicle occupant;
(b) detecting the presence of another instruction signal from a vehicle occupant;
(c) detecting the presence of an occupant in said second zone when said second air-conditioning unit is in off state in the presence of said another insruction signal; and
(d) changing the direction of airflow from air outlet of said first air-conditioning unit in the presence of an occupant in said second zone when said second air-conditioning unit is in off-state.

* * * * *